(12) United States Patent
Cheng

(10) Patent No.: US 7,969,038 B2
(45) Date of Patent: Jun. 28, 2011

(54) POWER REGENERATION MANAGEMENT SYSTEM

(75) Inventor: Louis Cheng, Richmond Hill (CA)

(73) Assignee: Honeywell International Inc., Morristown, NJ (US)

( * ) Notice: Subject to any disclaimer, the term of this patent is extended or adjusted under 35 U.S.C. 154(b) by 357 days.

(21) Appl. No.: 12/334,250

(22) Filed: Dec. 12, 2008

(65) Prior Publication Data

US 2010/0148577 A1    Jun. 17, 2010

(51) Int. Cl.
*B60L 1/00* (2006.01)
*B60L 3/00* (2006.01)
*H02G 3/00* (2006.01)

(52) U.S. Cl. ........................................ 307/9.1
(58) Field of Classification Search .................. 307/11, 307/9.1; 322/20, 24; 361/20
See application file for complete search history.

(56) References Cited

U.S. PATENT DOCUMENTS

| | | | |
|---|---|---|---|
| 6,798,627 B2* | 9/2004 | Schultz et al. | 361/20 |
| 2008/0165456 A1 | 7/2008 | Ganev et al. | |
| 2010/0066165 A1* | 3/2010 | Ganev et al. | 307/9.1 |

* cited by examiner

*Primary Examiner* — Jared J Fureman
*Assistant Examiner* — Carlos Amaya
(74) *Attorney, Agent, or Firm* — Miriam Jackson, Esq.

(57) ABSTRACT

Properly managing surges of regenerative power is needed in systems where power is generated and distributed to mechanical and electrical loads to protect them from overvoltage. A controller provides protection against excess regenerative power when these systems operate at a wide range of speeds. Controller functions and control methods for overvoltage protection may include an added control loop for detecting an overvoltage condition, calculating a power factor and generating a gating signal to transition the controller into a motoring mode that converts the excess regenerative power into mechanical power.

18 Claims, 11 Drawing Sheets

POWER REGENERATION MANAGEMENT SYSTEM

BACKGROUND OF THE INVENTION

The present invention generally relates to apparatus, methods and system configuration for protecting power generation, distribution and management systems against overvoltage in a broad range of machine conditions. More specifically, the present invention relates to apparatus, methods and system configuration for protecting a More Electric Aircraft against transient overvoltage when the system is utilized at less than 100% rated speed.

Power systems such as a More Electric Aircraft and electric vehicles can be susceptible to excessive power regeneration during braking of the motors or actuators that can cause overvoltage. Resistors are often used in these systems to convert excess electrical energy which is dissipated in the form of heat. However, these resistors are heavy and bulky and add to the weight of the system.

In an effort to address the above potential problem of overvoltage, an experimental system in which power is generated and distributed to mechanical and electrical loads, such as in an aircraft, was set up to simulate control configurations capable of managing an overvoltage event in such a manner as to dissipate the excess power in the form of mechanical energy. A controller configuration initially tested in an effort to manage transient overvoltage events appeared to work well at near 100% of machine rated speed, but failed to control overvoltage at 70% of the machine rated speed.

As can be seen, there is a need for a better system to deal with the power regeneration surges originating, for example, from peak use of motors and actuators.

SUMMARY OF THE INVENTION

In one aspect of the present invention, a controller comprises a first regulator programmed to compute a power factor from a dc bus voltage signal fed to the first regulator; and a second regulator programmed to compute an ac current magnitude from the power factor and from a dc load current signal fed into the second regulator.

In another aspect of the present invention, a method for regulating a power generation, distribution and management system comprises feeding a dc bus voltage signal to the controller; feeding a dc load current signal; computing a power factor from the dc bus voltage input signal; computing an ac current magnitude from the power factor and the dc load current signal; computing ac current command values in a synchronous frame from the power factor and from the ac current magnitude; computing differences between the ac current command values and measured ac current values in the synchronous frame; computing output voltage command values from the computed differences; and producing gating signals from the output voltage command values.

In yet another aspect of the present invention, a power generation, distribution and management system comprises at least a mechanical power generator; at least one motor; at least one mechanical load; a plurality of electrical loads containing a plurality of bus capacitors; and a controller in direct communication with the motor, the electrical loads and the bus capacitors.

These and other features, aspects and advantages of the present invention will become better understood with reference to the following drawings, description and claims.

DETAILED DESCRIPTION OF THE INVENTION

Figure 1:
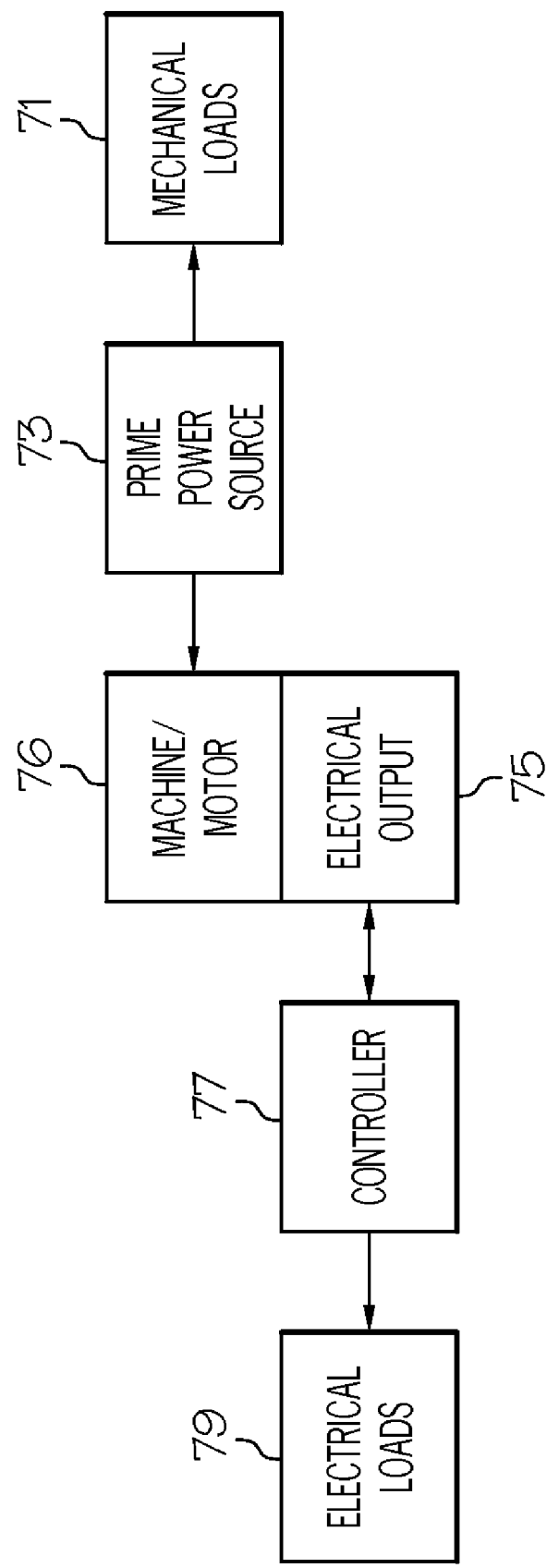
FIG. 1 is a schematic diagram of a power generation, distribution and management system having a controller according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can be each be used independently of one another or in combination with other features. However, any single inventive feature may not address any of the problems discussed above or may only address one of the problems discussed above. Further, one or more of the problems above may not be fully addressed by any of the features described below.

The present invention generally provides a system configuration, a controller and controller functions, and a method for regulating the power regeneration in a power generation, distribution and management system such as a More Electric Aircraft (MEA) or an electric vehicle. A power generation, distribution and management system may include a prime power source, a machine containing a motor, a controller, mechanical loads and electrical loads. The prime power source moves the motor which produces a three phase alternate current system output. The controller rectifies and regulates the electrical output, typically to a 270 direct current Volts, which provides power to the electrical loads. During normal operations, the prime power source drives the machine motor and the mechanical loads and provides power to the electrical loads. Thus:

Prime Power source=Motor power+Mechanical loads+Electrical loads.

In an aircraft, for example, a turbo generator moves the aircraft engine which produces an alternate current (ac current) through the controller.

In a power generating operation, the controller converts the alternate current into a regulated direct current output by adjusting the power factor and the alternate current magnitude. The direct current (dc current) output supplies the electromechanical loads whose components include valves, compressors and the cooling system, and the electrical load components including for example the lights, the main engine starter, the radar, the actuators and the avionics.

The system of the present invention may be configured to convert electrical energy into mechanical energy for use by the mechanical loads. This is unlike the prior art of using resistors to convert excess electrical energy into heat. The controller configuration of the present invention may provide control loops to calculate a power factor from which a gating signal is generated in a feed forward path. If regenerative energy is returned to the controller from the loads and charges the direct current bus capacitor and the bus capacitance voltage exceeds the threshold, the controller will transition into motoring mode by adjusting its power factor. As such, the energy from the direct current bus will be converted into mechanical power that is directed to drive a mechanical load. Under these conditions, both the motor and prime power source provide mechanical power to the loads as follows:

Prime Power source+Motor power=Mechanical loads+Electrical loads.

Referring to FIG. 1, there is shown a generalized diagram of a power generation, distribution and management system including a prime power source 73, a machine containing a motor 76, a controller 77, mechanical loads 71, and electrical loads 79. The prime power source 73 may move the motor 76 which may produce a three phase alternate current system output 75. The controller 77 may rectify and regulate the electrical output typically to 270 direct current Volts which may provide power to the electrical loads 79 and may charge bus capacitors contained within the electrical loads. During normal operations, the prime power source may drive the machine motor and the mechanical loads and provide power to the mechanical loads and to the electrical loads.

Figure 2:
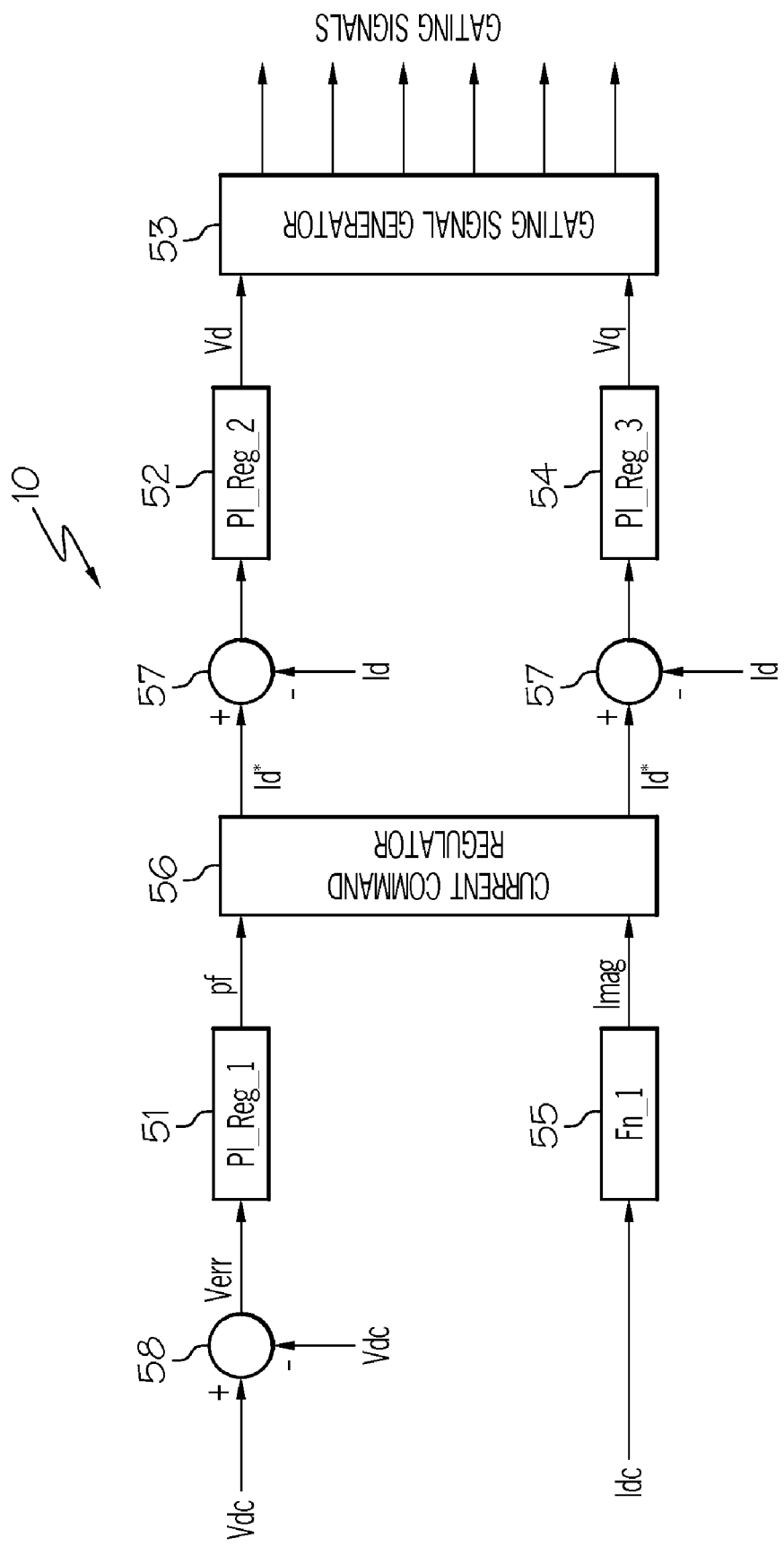
FIG. 2 is a schematic diagram of the controller of FIG. 1 for a power generation, distribution and management system according to an embodiment of the present invention.

Referring to FIG. 2, there is shown a block diagram of a controller 10, which may regulate the dc bus voltage (Vdc) by adjusting the power factor and the command ac current magnitude. The dc bus voltage may be compared with a voltage set point and processed by regulator PI_Reg_1 51 which is a proportional integral loop programmed to calculate a power factor (pf). Controller 10 is one embodiment of controller 77 of FIG. 1. The ac current magnitude (Imag) may be processed by the ac current magnitude regulator Fn_1 55, which is a pre-defined function that computes the ac current magnitude (Imag) from the dc bus or load current (Idc). The resulting ac current magnitude (Imag) and power factor (pf) may be used in computing the command ac currents by the current command regulator 56 in a synchronous frame (Id* and Iq*). The difference between the current commands (Id* and Iq*) and measured currents (Id and Iq) may be processed with voltage control regulators PI_Reg_2 52 and PI_Reg_3 54 to produce output voltage commands (Vd and Vq). Id and Iq are measured at a point between the motor and the controller in the system. The difference between the current commands (Id* and Iq*) and measured currents (Id and Iq) may be calculated by an ac current subtraction function 57. The gating signal generator 53 may produce the gating signal to the controller in accordance with control commands (Vd and Vq). During the regenerative operation, the load can retrofit power to the dc bus and charge the bus capacitor. If the regenerative power is in excess the power required to charge the bus capacitors, the controller may change the power factor such that the controller switches to operating in a motoring mode which converts the regenerative electrical power into mechanical power by the mechanical loads.

Figure 3:
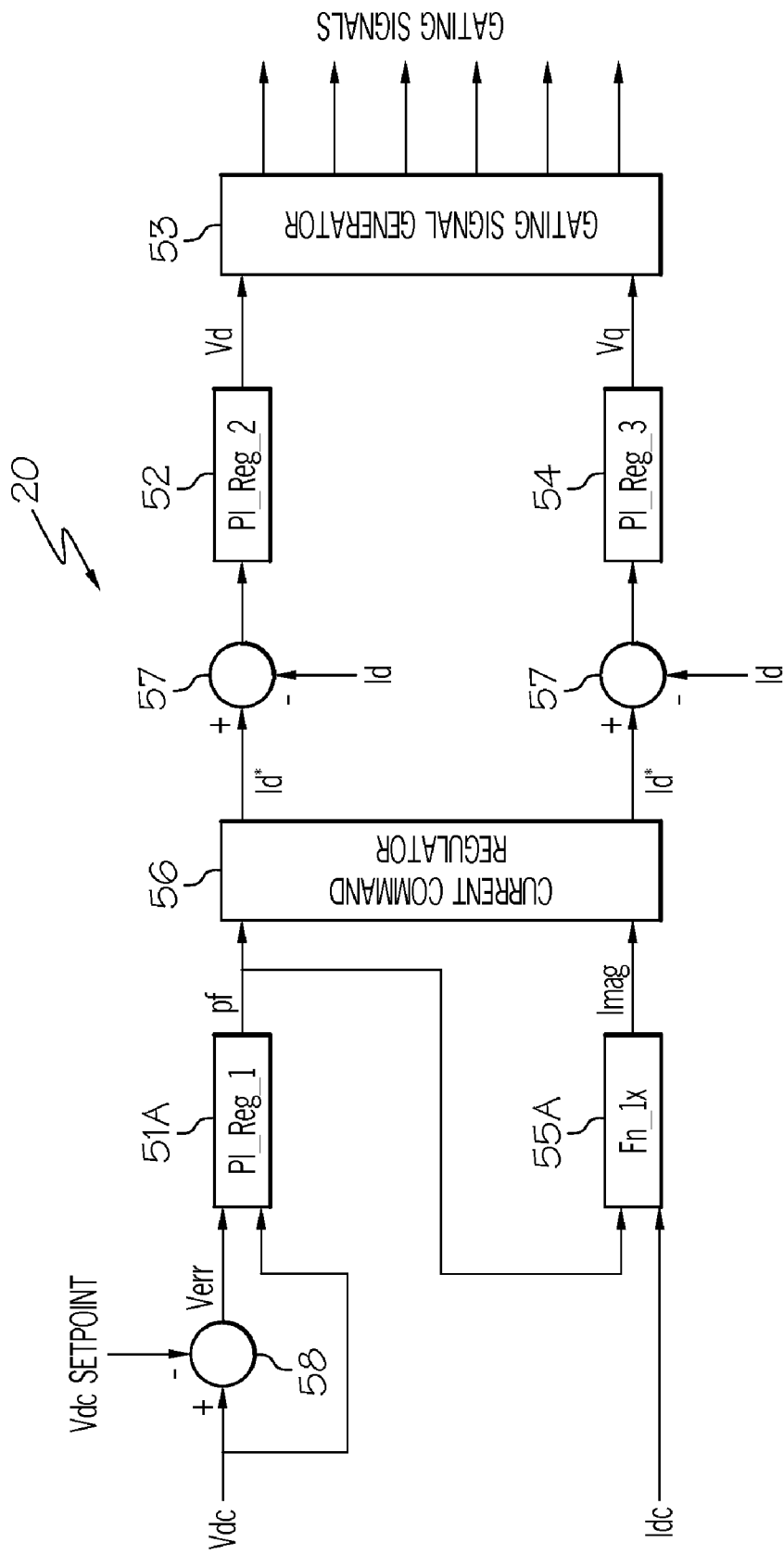
FIG. 3 is a schematic diagram of a modified controller of FIG. 1 according to an embodiment of the present invention.

Referring to FIG. 3, there is shown a block diagram of a modified controller 20 according to an embodiment of the present invention. Controller 20 is another embodiment of controller 77 of FIG. 1. In this configuration, ac current magnitude regulator Fn_1 55 and power factor control regulator PI_Reg_1 51 may be modified into regulators Fn_1x 55A and PI_Reg_1x 51A respectively. In the modified controller configuration 20, the modified power factor control regulator PI_Reg_1x 51A may process the dc bus voltage signal, Vdc, and a voltage error signal, Verr, and may compute a power factor. The voltage error signal, Verr, may be calculated from the difference between the dc bus voltage, Vdc, and a predetermined voltage set-point. The difference calculation may be performed by a dc voltage subtraction function 58. The modified ac current magnitude regulator Fn_1x 55A may process the calculated power factor and the dc load current (Idc) and calculate the ac current magnitude (Imag). The remaining functions and regulator blocks for the modified controller configuration 20 may be the same as those of controller configuration 10 of FIG. 2.

Figure 4:
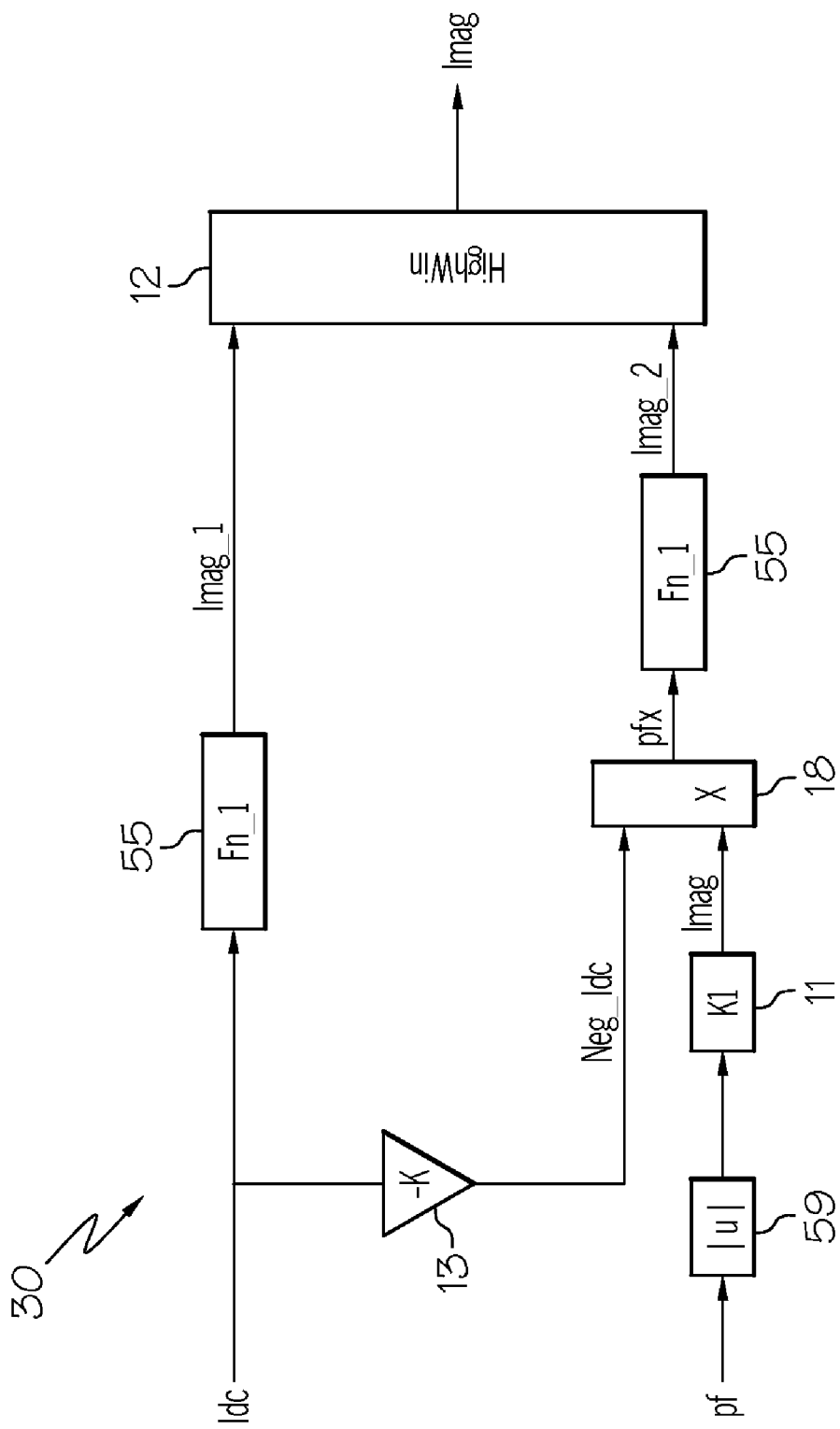
FIG. 4 is a schematic diagram of a modified current magnitude regulator of the controller of FIG. 3 according to an embodiment of the present invention.

Referring to FIG. 4, there is shown a configuration of the modified power factor regulator 30, also represented by PI_Reg_1x 51A. The control function of control regulator block Fn_1 55 may be that of controller configuration 10, but processed with the additional control path using power factor pf. In accordance with this control path, the dc bus current (Idc) may be processed by an ac current magnitude regulator Fn_1 55 to produce the command ac current magnitude (Imag_1). In addition, the power factor (pf) may be converted to an absolute value by multiplier function 59 and multiplied by constant K1 at multiplier function 11. The product of this results may be multiplied by a constant –K at multiplier function 13 and by the dc input load current (Idc) at multiplier function 18 to yield a modified power factor (pfx). The constant (–K) is the inverse in polarity of the load input current Idc. The modified power factor may be processed through an ac current magnitude regulator Fn_1 55 to yield command ac current magnitude Imag_2. This path may give a positive value of command ac current magnitude, (Imag_2), and modulate the command ac current magnitude, Imag, in accordance with the regenerative power. A selector function, High-Win, 12 may select the greater value between command ac current magnitude Imag_1 and command ac current magnitude Imag_2 and set it as Imag. Therefore, the command ac current magnitude Imag_1 may be selected at normal operation, but Imag_2 may be used during the regenerative power condition. Accordingly, the ac current magnitude adjustment may operate in a feedforward path.

Figure 5:
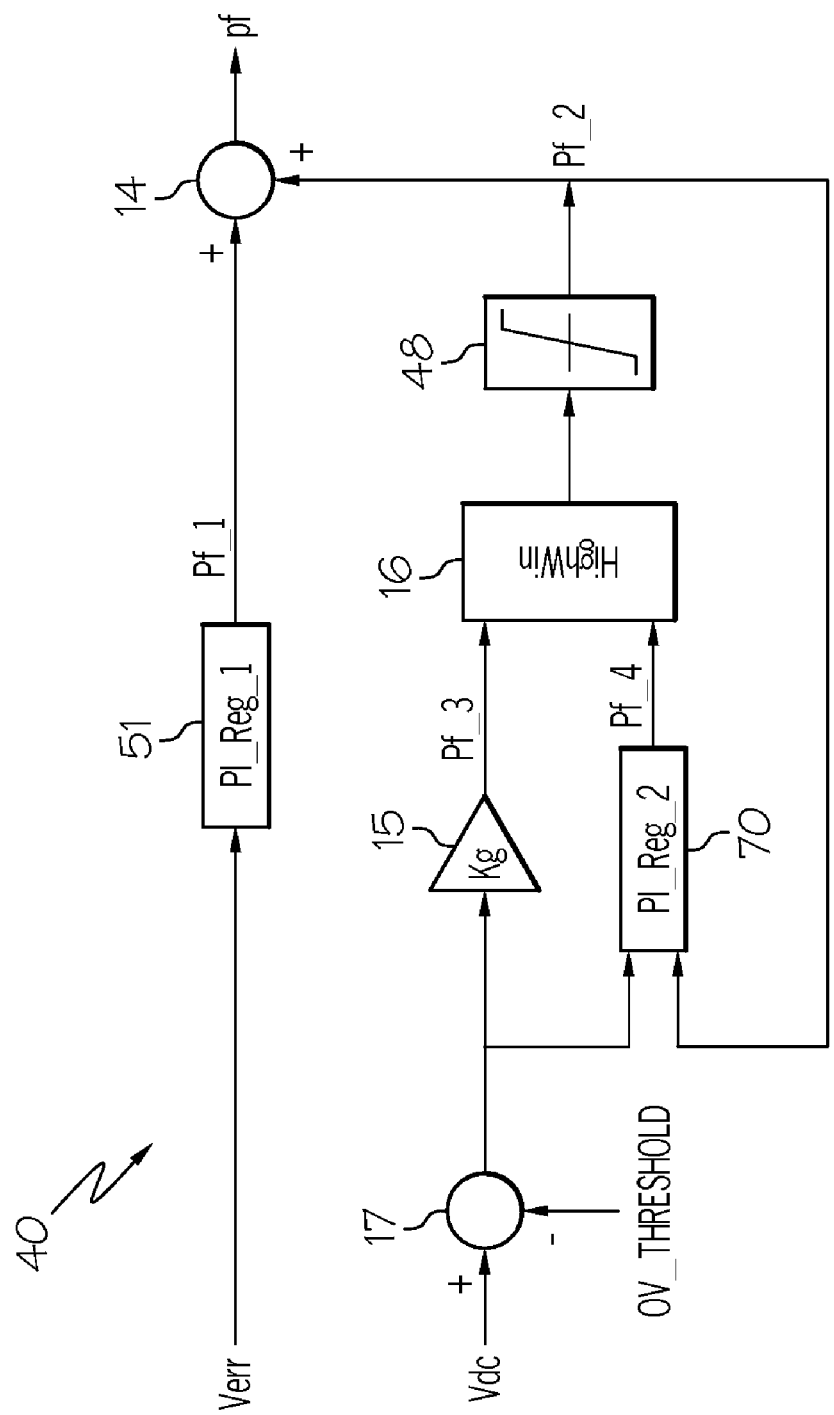
FIG. 5 is a schematic diagram of a modified power factor control regulator of the controller of FIG. 3 according to an embodiment of the present invention.

Referring to FIG. 5, there is shown a modified power factor control regulator diagram 40 i.e., control regulator PI_Reg_1x 51A. This regulator may be a modified configuration of the power control regulator PI_Reg_1 51 used in controller configuration 10. PI_Reg_1x 51A comprises of two sections: an operational control section and a regenerative power control section. The operational control section may compute the power factor from the voltage differences (Verr) between the measured dc bus voltage (Vdc) and a voltage set point. The voltage difference (Verr) computation may be performed by regulator function PI_Reg_1 51 used in the operational method and produces the power factor Pf_1. The regenerative path includes the dc bus voltage measurement (Vdc), gain function Kg 15, power factor selector function HighWin 16, a limiter function 48 and integrator regulator function PI_Reg_2 70. In this path, a threshold voltage value (OV_Threshold) may be subtracted from the measured voltage Vdc using a dc bus voltage subtraction function 17, and the result may be multiplied by a gain function Kg 15 to yield Pf_3. The subtraction result may be processed by integrator regulator function PI_Reg_2 70 along with an initializing value. The integrator regulator function 70 produces power factor Pf_4. Power factor selector function, HighWin 16 may select the greater of power factors Pf_3 and Pf_4, and the result may be fed into a limiter function 48 that may limit the output to between 0 and 1. The output value of the limiter may be set as power factor Pf_2, which may be added to power factor Pf_1 to yield the power factor for the regulator, pf. Pf_2 may be fed back into the integrator regulator function 70 to replace the initializing value. The regenerative path may only be active when the regenerative power is detected and the bus voltage exceeds the threshold (Ov_Threshold). Under these conditions, the regenerative power control section may modify the power factor when the bus voltage (Vdc) exceeds the voltage threshold (e.g., 290 V). Accordingly, the regeneration section may operate in a feedforward path. If the voltage difference Verr is zero or negative, Pf_2 may be zero and the power factor pf may be generated by the operational section.

Figure 6:
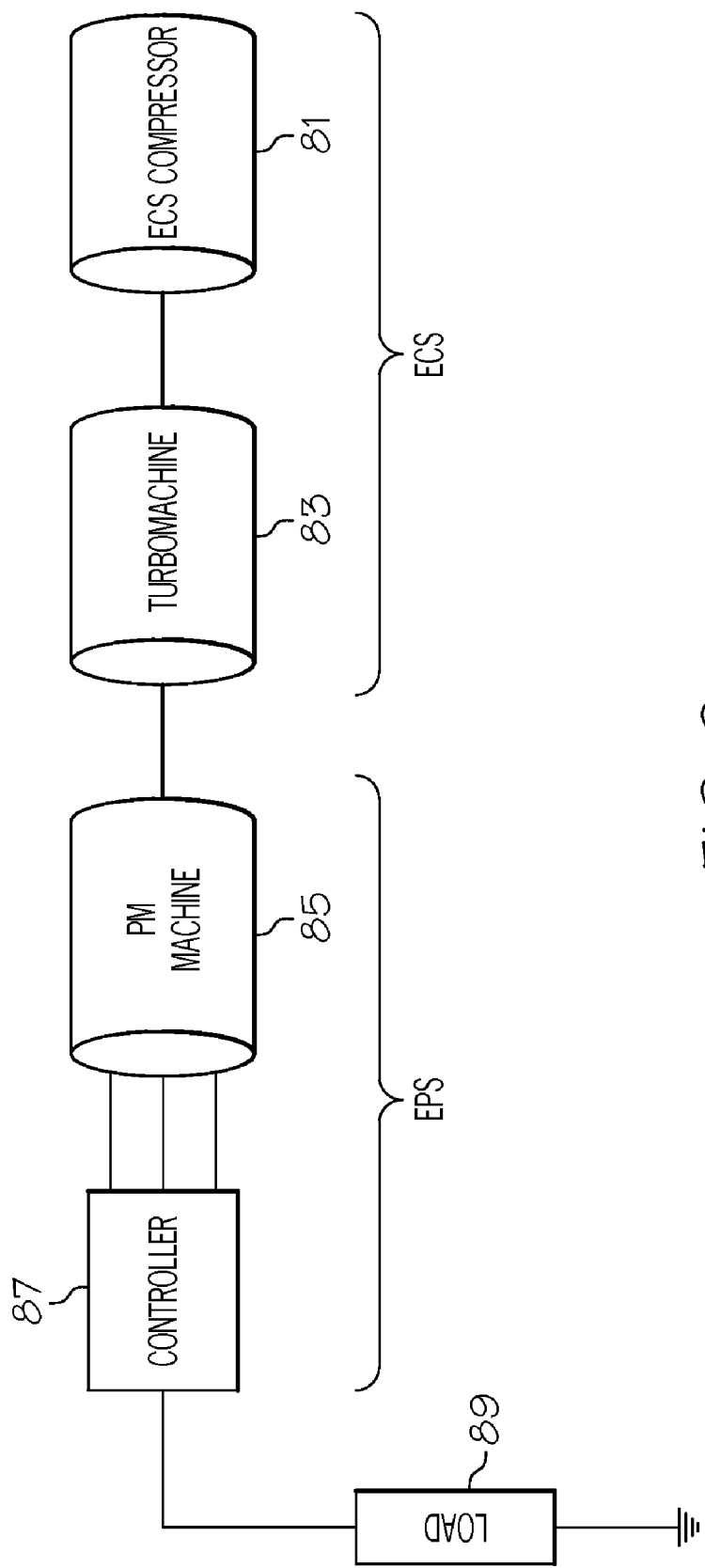
FIG. 6 is a block schematic of a Power and Thermal Management System used in the Examples to simulate the control system of the present invention.

Referring to FIG. 6, there is shown a diagram of a Power and Thermal Management (PTM) System used in simulation experiments to test the controller according to the present invention. This system, designed to simulate aircraft systems, includes an Environmental Control Sub-system (ECS) including a compressor 81 and a turbo machine 83, and an Electrical Power System (EPS). Both the ECS and EPS are connected to the same shaft. The EPS includes a Permanent Magnet Machine (PMM) 85 and a controller 87. The ECS controls the compressor 81 and turbo machine 83 and may provide thermal management for the aircraft loads 89. The controller may convert the ac input into a regulated 270 Vdc output. The simulations may be carried out under regenerative power conditions, where the peak power is the rated power of the PTM System, and the machine 83 may operate at between about 70% to about 100% of the rated speed. The PMM 85 controller may adjust the power factor and ac current magnitude to operate in a motoring mode. In this mode, energy returned from the load may be converted into mechanical energy and used by the ECS.

Figure 7:
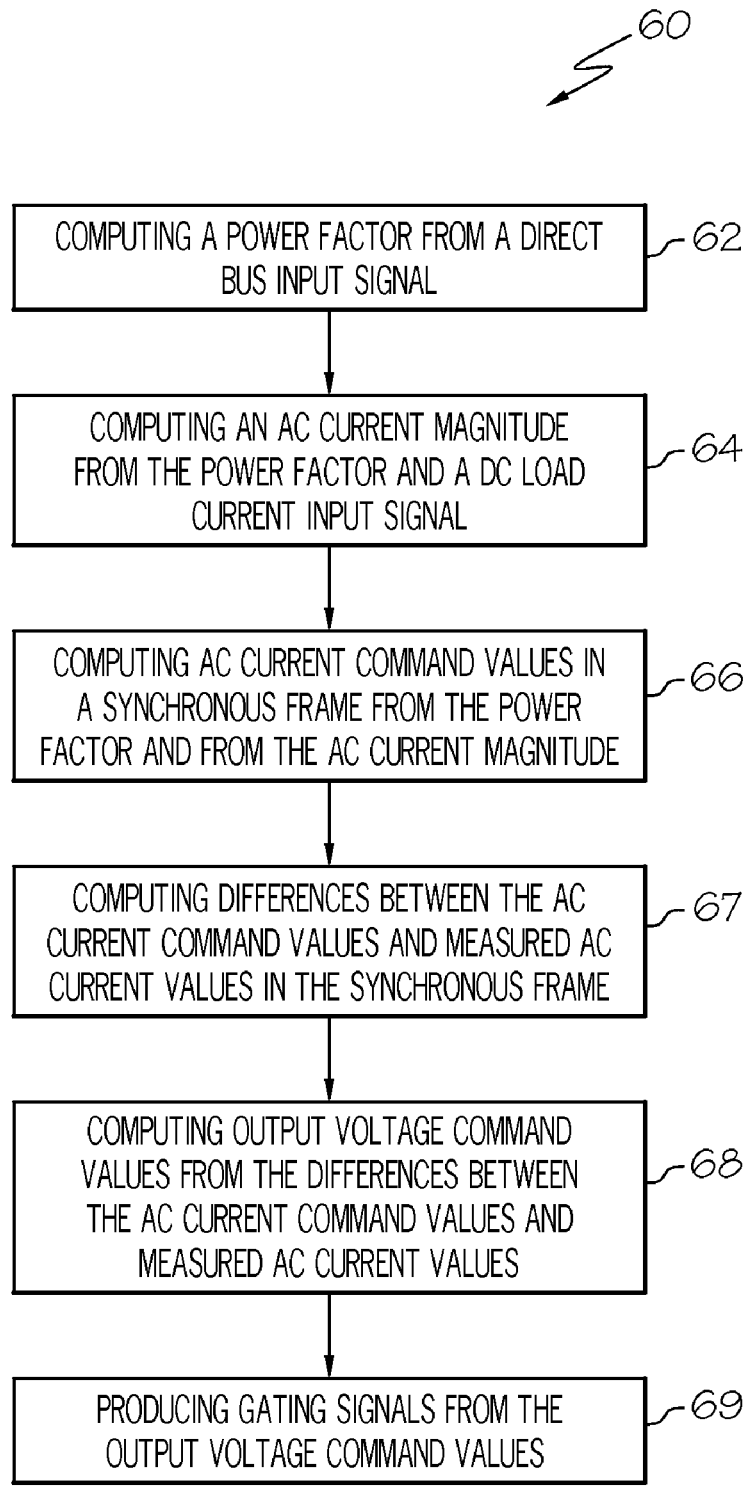
FIG. 7 is a flow chart showing a method according to the present invention.

Referring to FIG. 7, there is shown a flow chart depicting a method (60) according to the present invention. Step 62 may include computing a power factor from a direct bus input signal. Step 64 may include computing an ac current magnitude from the power factor and a dc load current input signal. Step 66 may include computing ac current command values in a synchronous frame from the power factor and from the ac current magnitude. Step 67 may include computing differences between the ac current command values and current system values that are measured between the motor and the controller in a synchronous frame. Step 68 may include computing output voltage command values from the differences between the ac current command values and current system values that are measured between the motor and the controller. Step 69 may include producing signals from the output voltage command values. The gating signals may transition the system into a motoring mode from a regenerative mode if excess regeneration power is detected in order to convert the excess regenerative power into mechanical energy.

EXAMPLES

The simulation of the control methods described in this application was conducted using a Power and Thermal Management (PTM) System shown in FIG. 6.

Example 1

Figure 8:
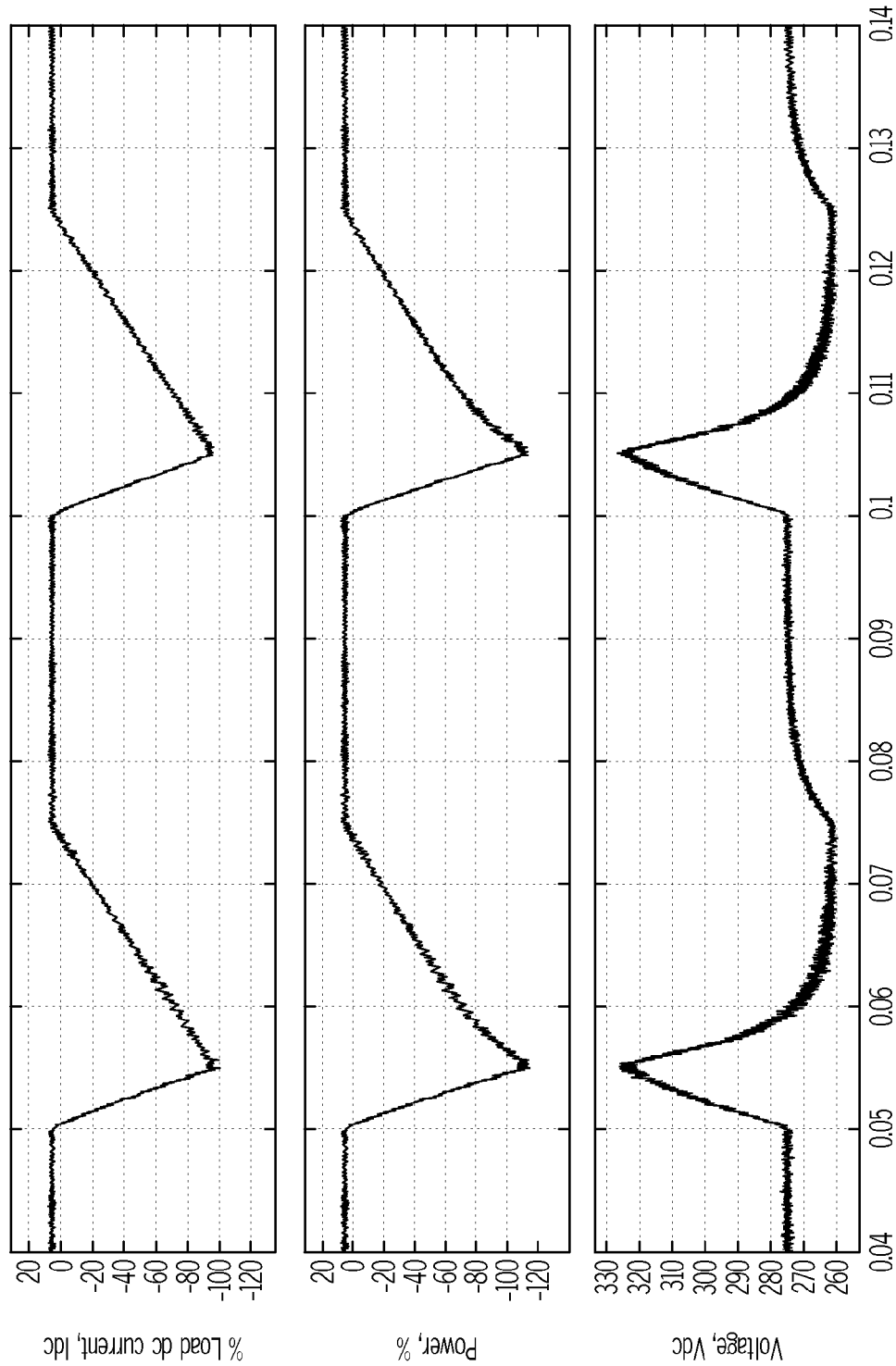
FIG. 8 is a response chart to the simulation of a control method for a system operating at 100% of the rated speed.

Referring to FIG. 8, a chart of the dc bus voltage (Vdc), % power, and % load dc current plotted vs. time in msec is shown representing a simulation for controller configuration 10 described in FIG. 2 operating at 100% of the rated speed. The regenerative power is retrofitted back to the dc bus and the energy is converted into mechanical power for the Environmental Control System (ECS). The maximum voltage at the bus is about 325 Vdc when the peak power is returned to the bus.

Example 2

Figure 9:
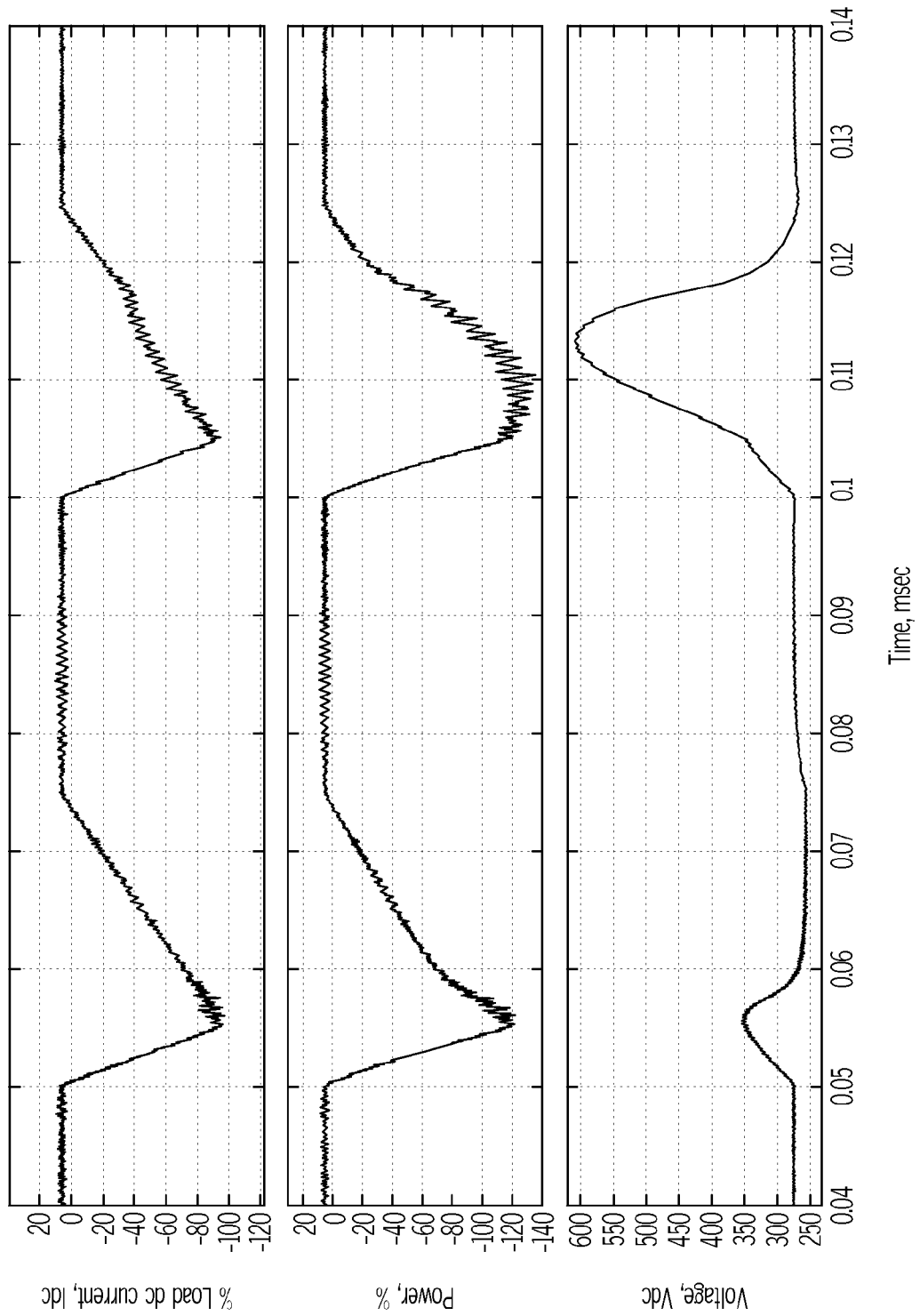
FIG. 9 is a response chart to the simulation of a control method for a system operating at 70% of the rated speed.

Referring to FIG. 9, a chart of the dc bus voltage (Vdc), % power, and % load dc current plotted vs. time in msec is shown representing a simulation for controller configuration 10 described in FIG. 2 operating at 70% of the rated speed. The back emf of the PMM is reduced at this lower speed. As such, the output power capability of the PMM is also reduced. The regenerative power is retrofitted back to the dc bus at around 5 milliseconds and 10 milliseconds. The peak voltage rose to 350 Vdc at 5.5 milliseconds and 600 Vdc at 115 milliseconds. During the first event, the command ac current magnitude, Imag, was assumed at the maximum magnitude due to the initial start up transient. Therefore, the PMM system was capable of maintaining the peak voltage at 350 Vdc. In the second incident, the current command was reduced and the controller malfunctioned. This controller configuration failed to regulate the output voltage which surged to 600 Vdc.

Example 3

Figure 10:
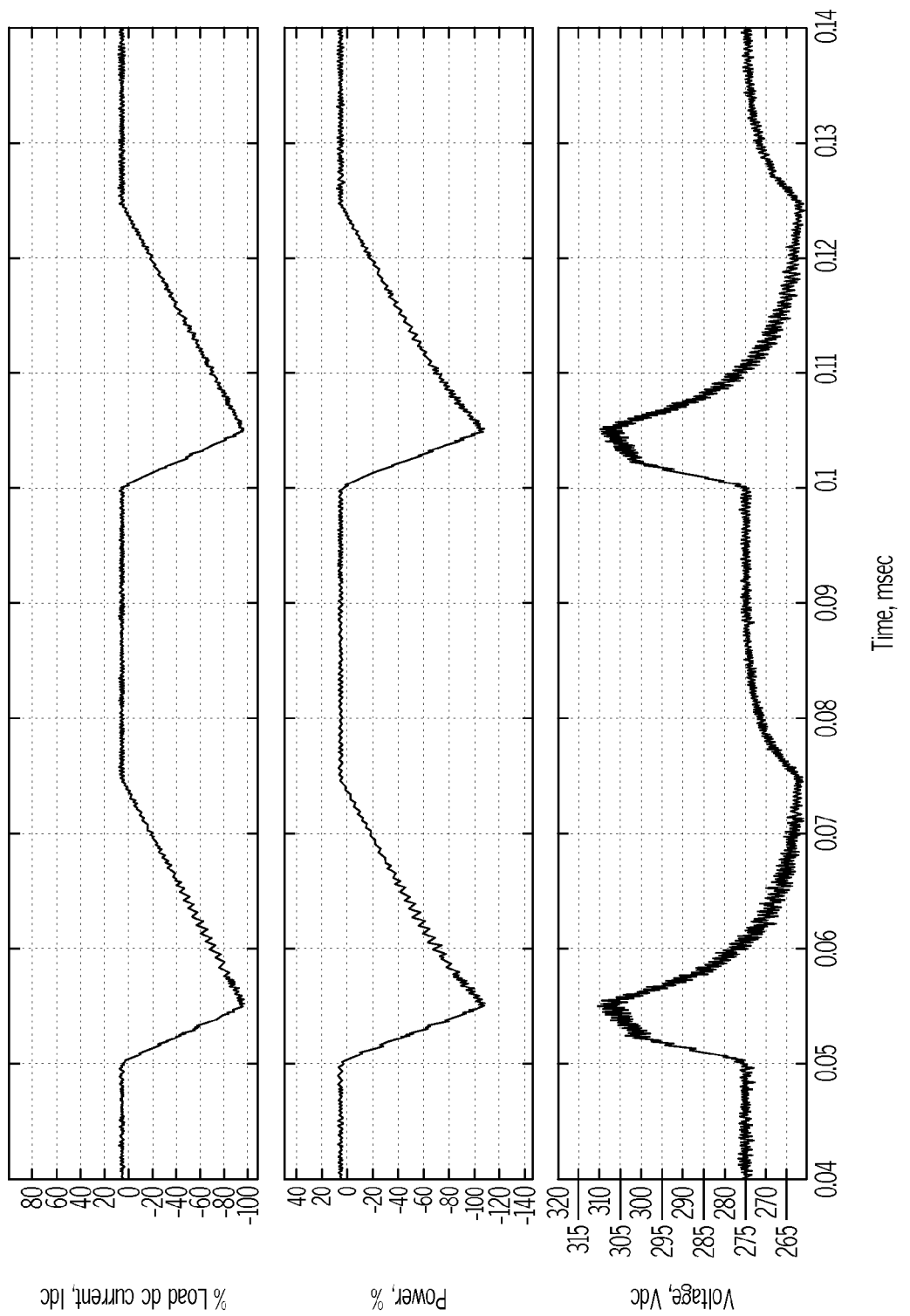
FIG. 10 is a response chart to the simulation of a control method according to an embodiment of the present invention for a system operating at 100% of the rated speed.

Referring to FIG. 10, a chart of the dc bus voltage (Vdc), % power, and % load dc current plotted vs. time in msec is shown representing a simulation for the controller configuration 20 described in FIG. 3 operating at 100% of the rated speed. When the voltage exceeds 300 Vdc, the angle compensation control loop is activated and converts the electrical power into mechanical power for the ECS. The maximum voltage at the bus is about 310 Vdc, which is about 15 Vdc lower than the voltage generated by controller configuration 10 in Example 1.

Example 4

Figure 11:
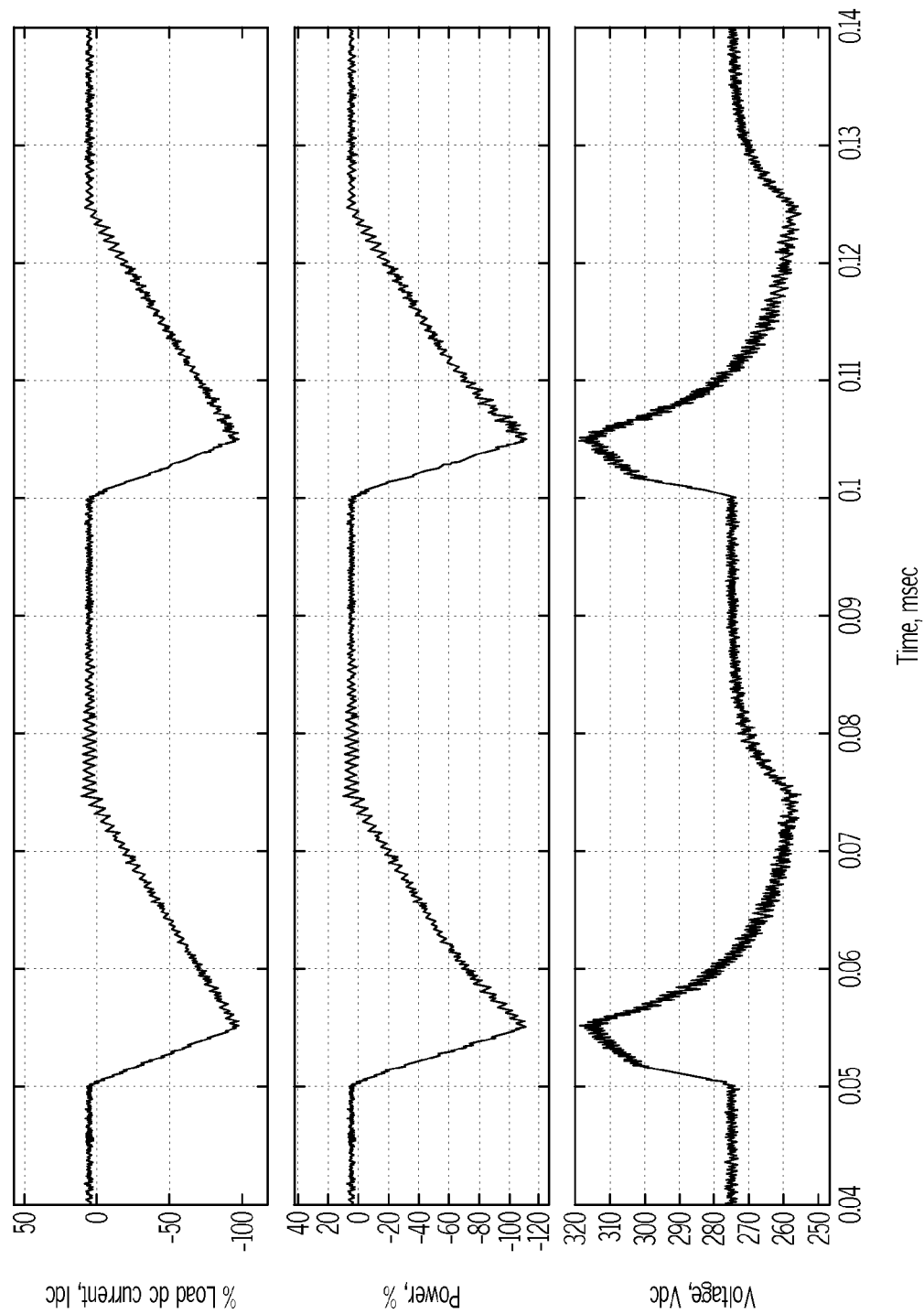
FIG. 11 is a response chart to the simulation of a control method according to an embodiment of the present invention for a system operating at 70% of the rated speed.

Referring to FIG. 11, a chart of the dc bus voltage (Vdc), % power, and % load dc current plotted vs. time in msec is shown representing a simulation for the controller configuration 20 described in FIG. 3 operating at 70% of the rated speed. The back emf of the PMM was reduced proportionally and the output power capability of the PMM was reduced accordingly. During the regenerative operation, both angle compensation control loop and current magnitude control loop were activated. When the dc bus voltage exceeded 300 Vdc, the angle compensation modified the power factor of the controller and operated in the motoring mode. Electrical power was converted into mechanical power. Also, the current magnitude mode increased in order to meet the regenerative power transient. The simulation results showed that the transient peak voltage was consistent at about 317 Vdc.

This controller configuration appears to provide more stable and consistent performance compared with controller configuration 10 of Example 2.

It should be understood, of course, that the foregoing relates to exemplary embodiments of the invention and that modifications may be made without departing from the spirit and scope of the invention as set forth in the following claims.

I claim:

1. A controller comprising:
   a first processor programmed to compute a power factor from a dc bus voltage signal fed to said first processor;
   a second processor programmed to compute an ac current magnitude from said power factor and from a dc load current signal fed into said second processor; and
   a third processor programmed for computing ac current command output values from said power factor and from said computed ac current magnitude fed into said third processor.

2. The controller of claim 1 further comprising at least one processor programmed to process difference measurements between said ac current command output values and measured ac current signals and to produce output voltage command values from said difference measurements.

3. The controller of claim 2, further comprising a processor that functions as a gating signal generator programmed to generate a gating signal from said output voltage command values.

4. The controller of claim 1, wherein said second processor comprises:
   a first function to compute a first ac current magnitude;
   a second function to compute a second ac current magnitude from said power factor; and
   a third function to select said ac current magnitude as the greater of the first and second ac current magnitudes.

5. The controller of claim 4, wherein the second function comprises a function to invert a positive polarity of said dc load current signal to a negative polarity.

6. The controller of claim 1, wherein said first processor comprises:
   a first control function to compute a first power factor;
   a regenerative control function to compute a second power factor from the dc bus voltage signal; and
   a third control function to combine said first power factor to said second power factor.

7. The controller of claim 6, wherein said regenerative control function comprises:
   a dc bus voltage subtraction function wherein a threshold voltage is subtracted from the dc bus voltage signal;
   a gain multiplier;
   an integrator regulator function;
   a power factor selector function; and
   a limiting function.

8. A power generation, distribution and management system comprising:
   at least a mechanical power generator;
   at least one motor;
   at least one mechanical load;
   a plurality of electrical loads, said electrical loads containing a plurality of bus capacitors; and
   a controller comprising;
   a first processor programmed to compute a power factor from a dc bus voltage signal fed to said first processor; and
   a second processor programmed to compute an ac current magnitude from said power factor and from a dc load current signal fed into said second processor,
   the controller being in direct communication with the motor, the electrical loads and the bus capacitors.

9. The power generation, distribution and management system of claim 8, wherein said controller is adapted to generate signals for transitioning said system from a regenerative mode to a motoring mode wherein regenerative power is converted into mechanical energy by the mechanical loads.

10. A method for regulating a power generation, distribution and management system comprising:
    feeding a dc bus voltage signal to a controller;
    feeding a dc load current signal;
    computing a power factor from said dc bus voltage input signal;
    computing an ac current magnitude from said power factor and said dc load current signal;
    computing ac current command values from said power factor and from said ac current magnitude;
    computing differences between said ac current command values and measured ac current values;
    computing output voltage command values from said computed differences; and
    producing gating signals from said output voltage command values.

11. The method of claim 10, wherein computing the ac current magnitude comprises:
    computing a first ac current magnitude from said dc load current signal;
    computing a second ac current magnitude from said power factor and from said dc load current signal; and
    selecting the greater of the first ac current magnitude and second current magnitude.

12. The method of claim 11, wherein processing said power factor to generate the second ac current magnitude comprises:
    multiplying the absolute value of said power factor by a negative multiplier of said dc load current signal to produce a modified power factor; and
    processing the modified power factor through an ac current magnitude regulator to generate the second ac current magnitude.

13. The method of claim 10, wherein computing the power factor comprises:
    computing a difference between said dc bus voltage signal and a voltage set point;
    computing a first power factor from said difference;
    calculating a threshold dc voltage, said threshold dc voltage being the dc bus voltage above a predetermined dc voltage threshold value;
    generating a second power factor from said threshold dc voltage and from a gain multiplier;
    generating a third power factor by integrating the threshold dc voltage and an initializing value;
    selecting the greater of the second power factor and the third power factor, said greater power factor becoming a fourth power factor; and
    combining the first power factor with said fourth power factor to determine the power factor for the controller.

14. The method of claim 13, wherein if said bus voltage does not exceed the predetermined dc voltage threshold value, the first power factor becomes the power factor for the controller.

15. The method of claim 14 further comprising:
    operating the controller in a regenerative power mode wherein power is retrofitted for charging capacitors if the regenerative power does not exceed the capacitor charging requirements; and operating the controller in a motoring mode if the regenerative power is in excess of what is required to charge said capacitors, wherein operating the controller in a motoring mode is accomplished by changing the power factor of the controller.

16. The method of claim 15 further comprising converting the excess regenerative power into mechanical power by a mechanical load component.

17. The method of claim 15, wherein the controller operates in a feed-forward path when said bus voltage exceeds the predetermined dc voltage threshold value.

18. The method of claim 10, wherein the controller operates in a feed-forward path when the second command ac current magnitude is selected during regenerative power conditions.

* * * * *